(12) United States Patent
Hwang et al.

(10) Patent No.: US 7,366,255 B1
(45) Date of Patent: Apr. 29, 2008

(54) TIME DOMAIN ESTIMATION OF IQ IMBALANCE IN A WIRELESS OFDM DIRECT CONVERSION RECEIVER

(75) Inventors: Chien-Meen Hwang, San Jose, CA (US); Harish Kutagulla, San Jose, CA (US); Thomas Hanusch, Coswig (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 758 days.

(21) Appl. No.: 10/633,033

(22) Filed: Aug. 4, 2003

(51) Int. Cl.
*H04L 27/00* (2006.01)
(52) U.S. Cl. .................. 375/324; 375/260; 375/316; 375/340; 375/345
(58) Field of Classification Search ............... 375/324, 375/260, 316, 340, 345, 342
See application file for complete search history.

(56) References Cited

U.S. PATENT DOCUMENTS 6,370,211 B1 * 4/2002 Carsello ................. 375/346
6,721,547 B2 * 4/2004 Husted et al. ........... 455/226.1
2002/0118783 A1 * 8/2002 Cripps et al. ............. 375/347

OTHER PUBLICATIONS

Adaptive compensation for imbalance and offset losses in direct conversion transceivers, Cavers, J.K.; Liao, M.W.; Vehicular Technology, IEEE Transactions on vol. 42, Issue 4, Nov. 1993 pp. 581-588, Digital Object Identifier 10.1109/25.260752 □□.*
IEEE Std. 802.11a-1999, "Part 11: Wireless LAN Medium Access Control (MAC) and Physical Layer (PHY) specifications: Highspeed Physical Layer in the 5 GHZ Band", L.AN/MAN Standards Committee of the IEEE Computer Society, IEEE-SA Standards Board, Approved Sep. 16, 1999, New York, USA.

* cited by examiner

*Primary Examiner*—Ted Wang
(74) *Attorney, Agent, or Firm*—Manelli Denison & Selter PLLC; Leon R. Turkevich (57) ABSTRACT

An OFDM receiver is configured for suppressing pilot energy, and DC energy, from received I and Q components prior to estimating amplitude and phase imbalances of the received I and Q components. Hence, amplitude and phase imbalances can be estimated accurately despite channel fading and frequency variations between the transmitter and receiver.

10 Claims, 7 Drawing Sheets

TIME DOMAIN ESTIMATION OF IQ IMBALANCE IN A WIRELESS OFDM DIRECT CONVERSION RECEIVER

BACKGROUND OF THE INVENTION

1. Field of the Invention

The present invention relates to estimation of amplitude and phase imbalance in wireless direction conversion receivers, for example an IEEE 802.11a based Orthogonal Frequency Division Multiplexing (OFDM) receiver.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, etc. In particular, the IEEE Standard 802.11a, entitled "Wireless LAN Medium Access Control (MAC) and Physical Layer (PHY) specifications: High-speed Physical Layer in the 5 GHz Band", specifies an OFDM PHY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11 based OFDM PHY in hardware involves providing a cost-effective, compact device that can be implemented in smaller wireless devices. Hence, implementation concerns typically involve cost, device size, and device complexity.

Figure 1:
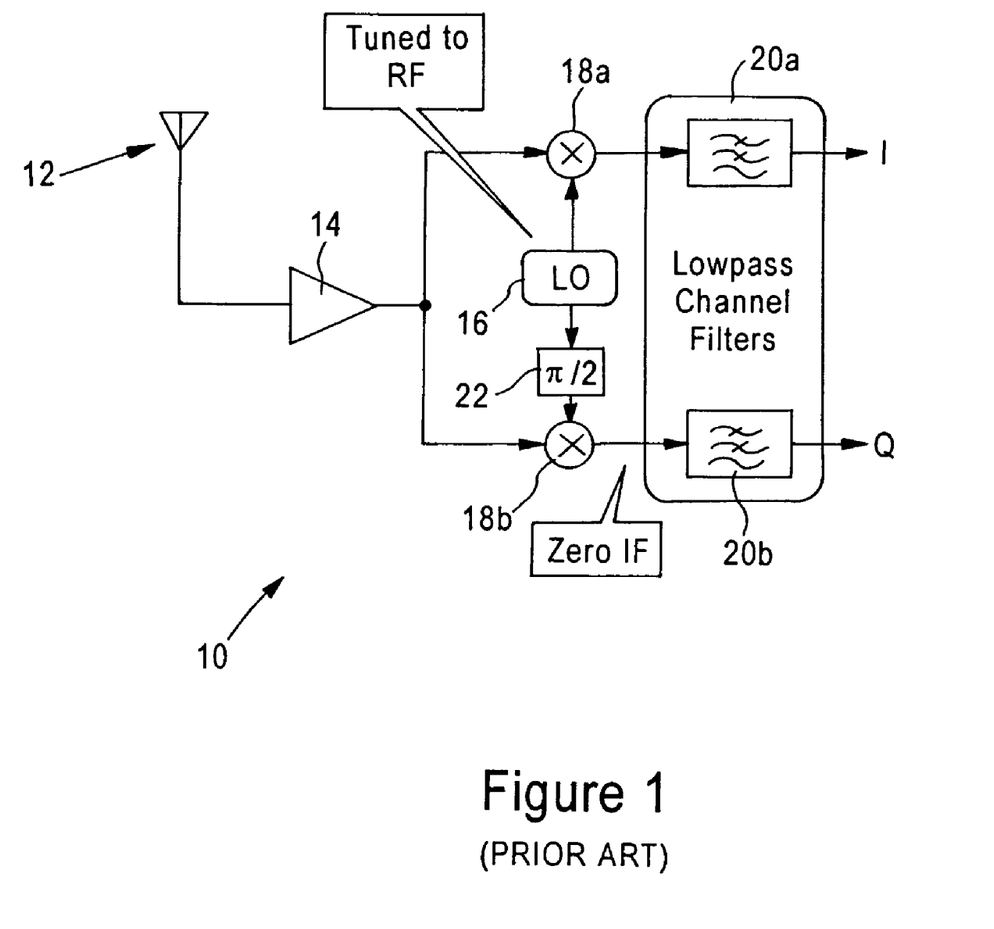
FIG. 1 is a diagram illustrating a conventional (PRIOR ART) direct conversion receiver configured for recovering I and Q components from a received IEEE 802.11 OFDM wireless signal.

FIG. 1 is a diagram of a typical direct conversion receiver. The direct conversion receiver 10 includes an antenna 12, a low noise amplifier 14, a local oscillator 16 tuned to a prescribed carrier frequency, mixers 18a and 18b, and lowpass channel filters 20a and 20b. As recognized in the art, I and Q channel signals are generated based on modulating a signal by a first carrier and a second carrier phase-shifted by $\pi/2$ (i.e., 90 degrees), respectively. The received signal is supplied to the mixers 18a and 18b. The mixer 18a outputs a first demodulated signal that includes the I component and a first carrier component (e.g., a sine wave); the mixer 18b, having received a phase-shifted carrier signal from the phase shifter 22, outputs a second demodulated signal that includes the Q component and a second carrier component (e.g., a cosine wave). The low pass filters 20a and 20b remove the respective carrier components and output the I and Q components, respectively.

A particular concern involves IQ imbalances in direct conversion receiver architecture. In particular, the I and Q components in theory should have the same respective amplitude and phase. However, the phase and amplitude of the I and Q components output by the direct conversion receiver 10 are not the same; hence, I/Q imbalance compensation is necessary to avoid deterioration of the signal to noise ratio which may prevent decoding of the received packet.

One technique for I/Q imbalance compensation involves estimating the I/Q imbalance in the time domain. In particular, the Amplitude Imbalance parameter ($\alpha$), and the Phase Imbalance parameter ($\Phi$) are estimated (sin $\Phi = \Phi$ for ($\Phi < 5$ deg)) as follows:

$$\alpha = \frac{\sum |I(k)|}{\sum |Q(k)|} \quad \phi = \frac{\sum I(k)Q(K)}{\sum I^2(k)}$$

The above summation is performed during the "DATA" payload period of an OFDM frame. The Amplitude Imbalance parameter ($\alpha$), and the Phase Imbalance parameter ($\Phi$) are used to compensate for the I/Q imbalance.

The above technique requires that the received I and Q components at the receiver antenna have equal energies before being downconverted by the analog components that are the main source of the amplitude and phase imbalance. However, modulation of the pilot carriers in IEEE 802.11a transmitters and channel fading results in unequal energies in the I and Q components. Hence, the above technique does not accurately estimate I/Q imbalance for OFDM transceivers operating according to IEEE 802.11a protocol.

SUMMARY OF THE INVENTION

There is a need for an arrangement that enables a direct conversion receiver to accurately estimate amplitude and phase imbalances using time-based estimation techniques, regardless of whether the received I and Q components have different energy levels.

There also is a need for an arrangement that enables a direct conversion receiver, configured for receiving IEEE 802.11a based OFDM wireless signals, to accurately estimate amplitude and phase imbalances of received I and Q components using time-based estimation techniques.

There also is a need for an arrangement that enables a direct conversion receiver to accurately estimate amplitude and phase imbalances of received I and Q components using time-based estimation techniques, regardless of channel fading effects or frequency offset between the transmitter and the direct conversion receiver.

These and other needs are attained by the present invention, where an OFDM receiver is configured for suppressing pilot energy, and DC energy, from received I and Q components prior to estimating amplitude and phase imbalances of the received I and Q components. Hence, amplitude and phase imbalances can be estimated accurately despite channel fading and frequency variations between the transmitter and receiver.

One aspect of the present invention provides a method in an OFDM direct conversion receiver configured for receiving a wireless signal. The method includes recovering first and second components from the wireless signal by mixing the wireless signal with first and second carrier frequency signals, respectively, the second carrier frequency signal phase-shifted by a prescribed amount relative to the first carrier frequency signal. The method also includes filtering a pilot carrier from each of the first and second components to obtain filtered first and second components, respectively, and estimating amplitude and phase imbalances between the filtered first and second components according to a time domain based estimation algorithm. The method also includes compensating for the amplitude and phase imbalances in the recovered first and second components.

Another aspect of the present invention provides an OFDM direct conversion receiver configured for receiving a wireless signal. The receiver includes an analog front end configured for recovering first and second components from the wireless signal by mixing the wireless signal with first and second carrier frequency signals, respectively, the second carrier frequency signal phase-shifted by a prescribed amount relative to the first carrier frequency signal. The receiver also includes a filter module, an estimator module, and a compensator. The filter module is configured for filtering a pilot carrier from each of the first and second components to obtain filtered first and second components, respectively. The estimator module is configured for estimating amplitude and phase imbalances between the filtered first and second components according to a time domain based estimation algorithm. The compensator is configured for compensating for the amplitude and phase imbalances in the recovered first and second components.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment will be described with reference to an overview of an IEEE 802.11 OFDM transceiver, followed by a detailed description of the I/Q compensation module implemented according to an embodiment of the present invention.

Receiver Architecture Overview

Figure 2:
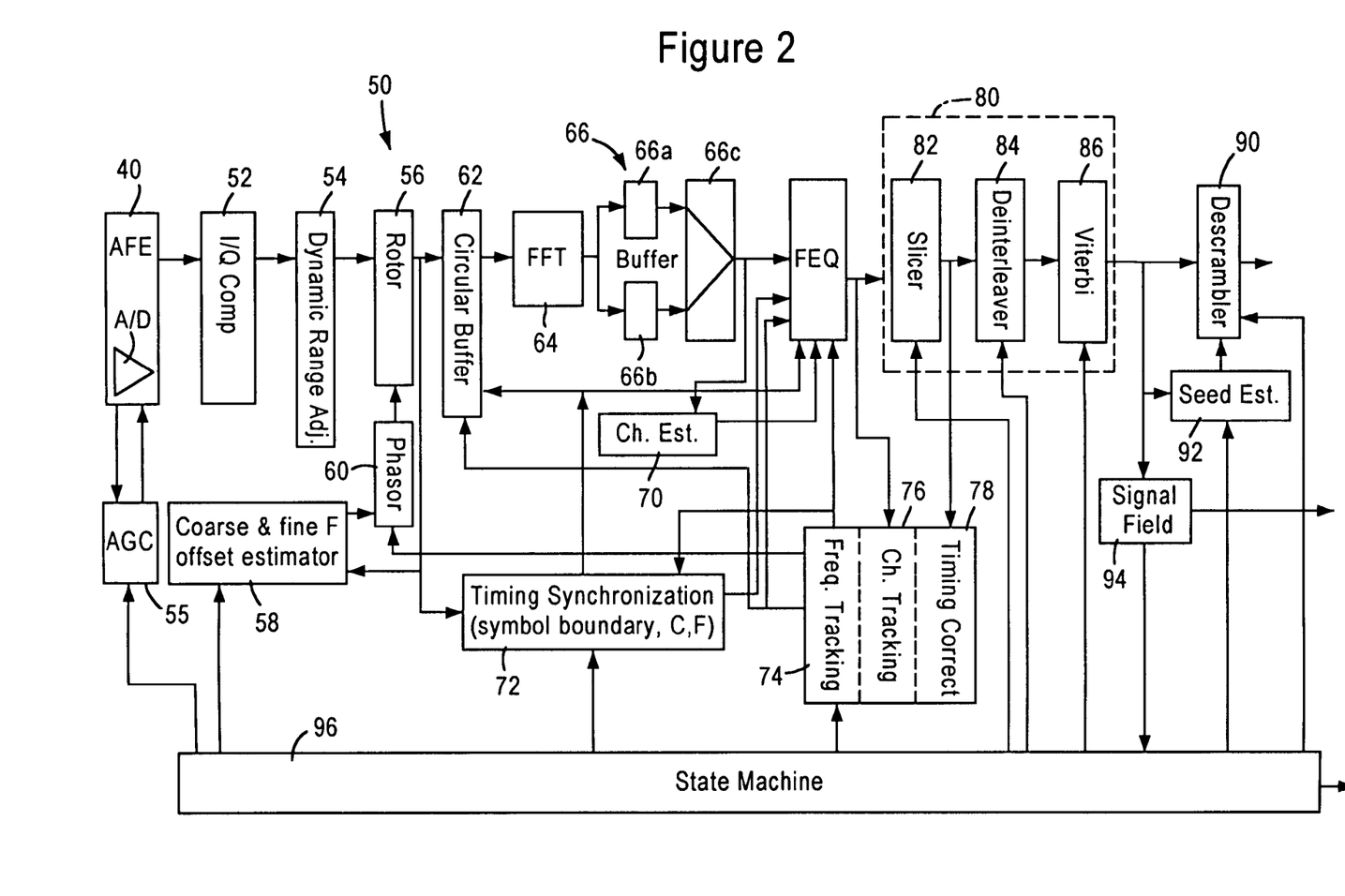
FIG. 2 is a diagram illustrating an IEEE 802.11 OFDM receiver according to an embodiment of the present invention.

FIG. 2 is a diagram illustrating an architecture of a receiver module 50 of an IEEE 802.11 Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F analog front end (AFE) amplifier 40 having an analog to digital (A/D) converter. The gain of the AFE amplifier 40 is controlled by an AGC module 55. The detected wireless signal samples include an I component and Q component: these I and Q components, which ideally should be orthogonal to each other and have a uniform relative gain, may in fact have a non-orthogonal phase difference (i.e., other than 90 degrees) and have an unequal gain. Hence, the I/Q mismatch compensation module 52 is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1-6) bits of information. According to the IEEE 802.11a/g specification, the physical layer data packet should include a short training sequence, a long training sequence, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer 68 is configured for reversing the fading encountered by the tones in order to provide equalized tones. Channel information is obtained by the channel estimator 70 from the long training sequence in the IEEE 802.11 preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11 specification.

The descrambler circuit 90 is configured for recovering the original serial bit stream from the decoded data, by descrambling a 127-bit sequence generated by the scrambler of the transmitter, according to the IEEE 802.11 specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11 compliant Media Access Controller (MAC).

Pilot and DC Offset Filtering for I/Q Imbalance Estimation

Figure 3:
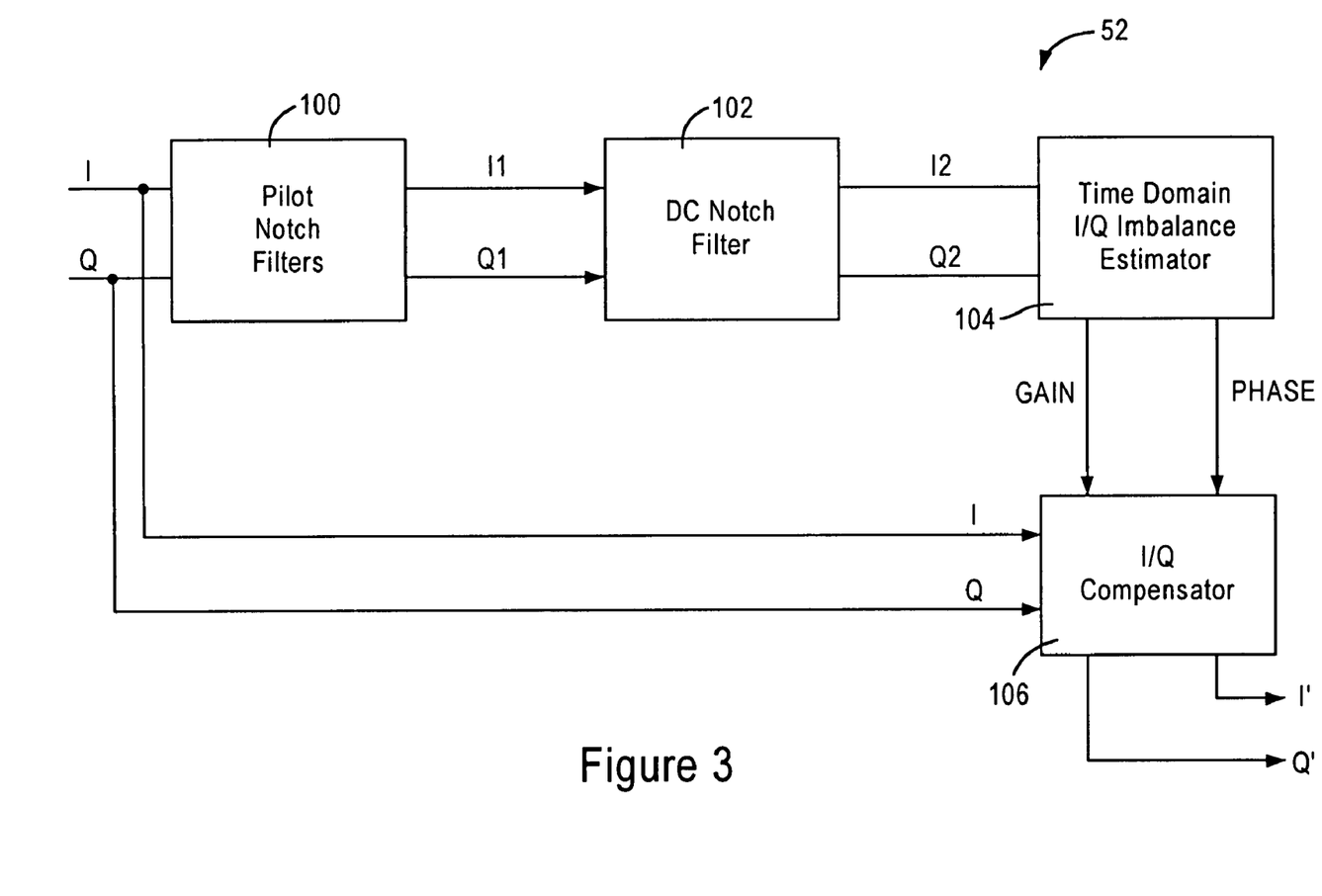
FIG. 3 is a block diagram illustrating the I/Q compensation module of FIG. 2 according to an embodiment of the present invention.

FIG. 3 is a diagram illustrating in detail the I/Q compensation module 52 of FIG. 2, according to an embodiment of the present invention.

OFDM is a multitone modulation comprising of data sub-carriers and pilots. The data modulated on the pilots is fixed while the data modulated on the data sub-carriers is random. To accurately measure the amplitude and phase imbalance it is essential that the channel characteristics do not effect the premise behind the algorithm that the received I,Q energies at the antenna are different resulting in inaccurate estimation. The analysis shown below illustrates how a frequency selective channel fade at any one or all of the pilots results in unequal energy distributions for the I,Q components.

Qualitative Analysis: the pilot subcarriers are at frequency positions (7,−7 21,−21) and are modulated by a (1,1,1,−1). The contribution of the pilots for each symbol is given by:

$$f1=7/TFFT, f2=21/TFFT$$

$$TFFT=FFT\ period$$

$$r(t)=\exp(j2*(\pi)*f1*t)+\exp(-j2*(\pi)*f1*t)+\exp(j2*(\pi)*f2*t)-\exp(-j2*(\pi)*f2*t)$$

which can be simplified to $$r(t)=2\cos(2*(\pi)*f1*t)+j2\sin(2*(\pi)*f2*t),$$

which results in the same energy in real part(inphase/I) and imaginary part(Q/quadrature) of the above relation. However, if one of the pilots is attenuated or completely lost the above relation no longer holds. As a receiver has no knowledge of the channel until it performs a frequency domain analysis much later, a simple solution in the time domain would be to filter out pilots to remove any such scenarios.

Figure 4:
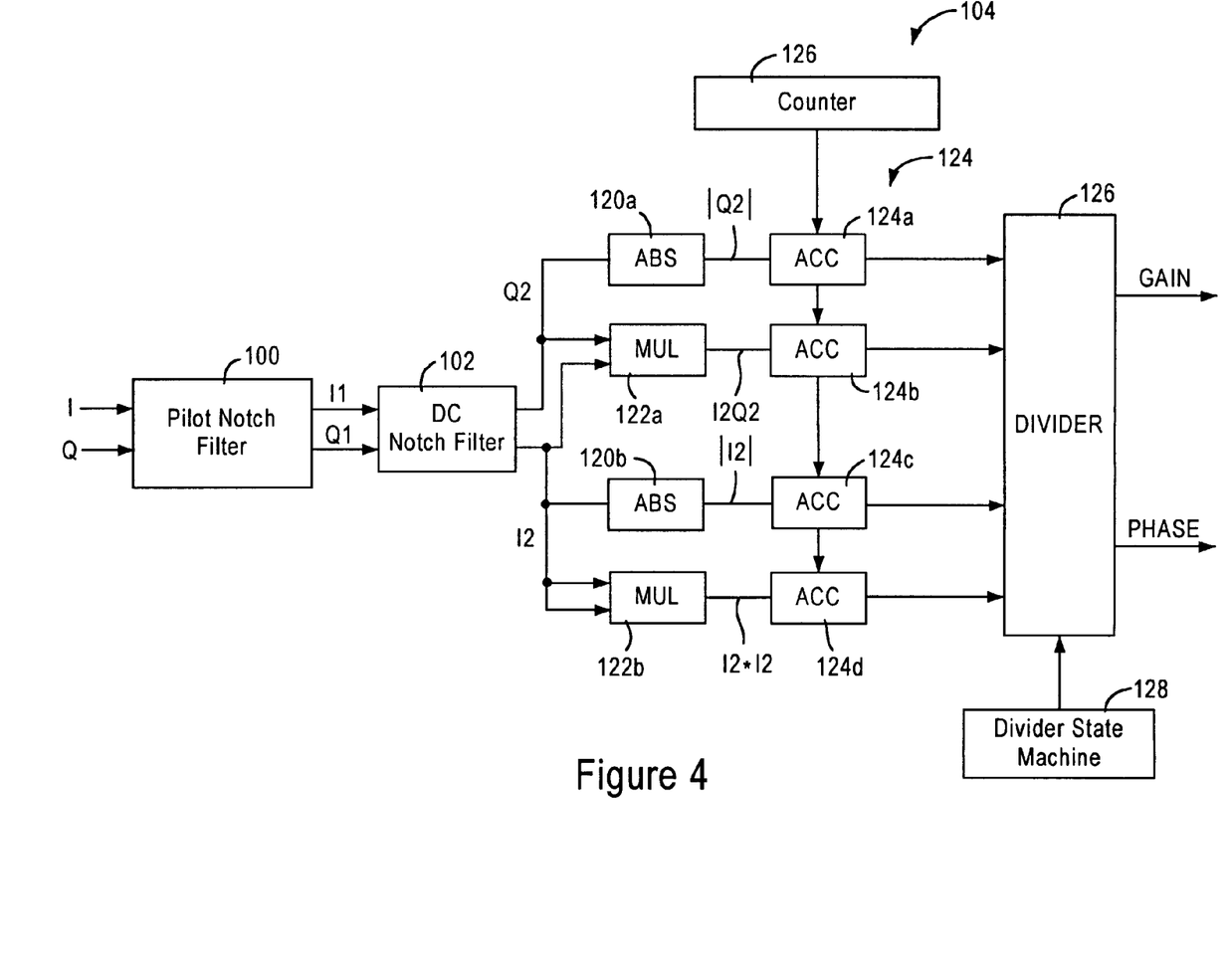
FIG. 4 is a diagram illustrating in further detail the I/Q compensation module of FIGS. 2 and 3 according to an embodiment of the present invention.
Figure 5A:
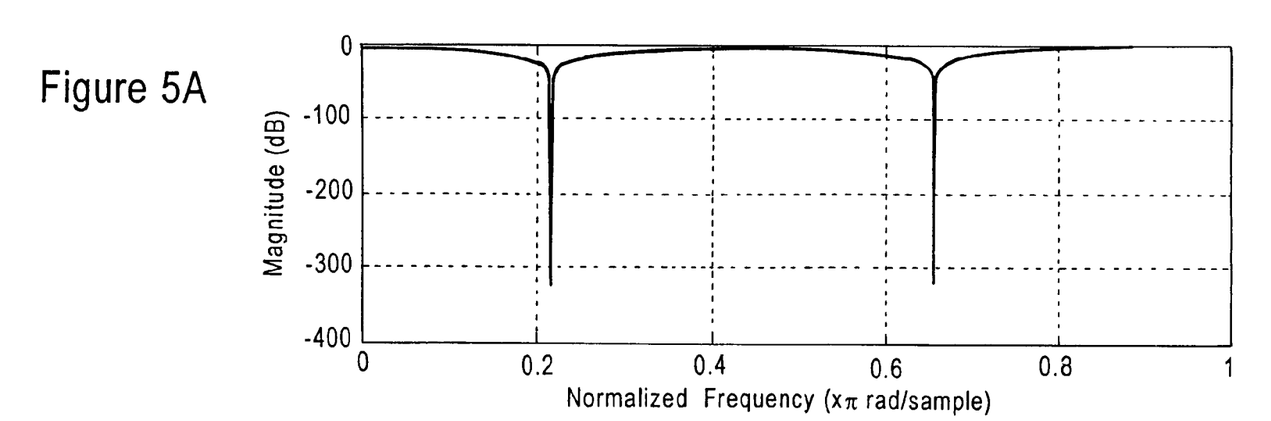
FIGS. 5A and 5B are diagrams illustrating frequency and phase responses, respectively, of the pilot notch filter of FIG. 4, respectively.
Figure 5B:
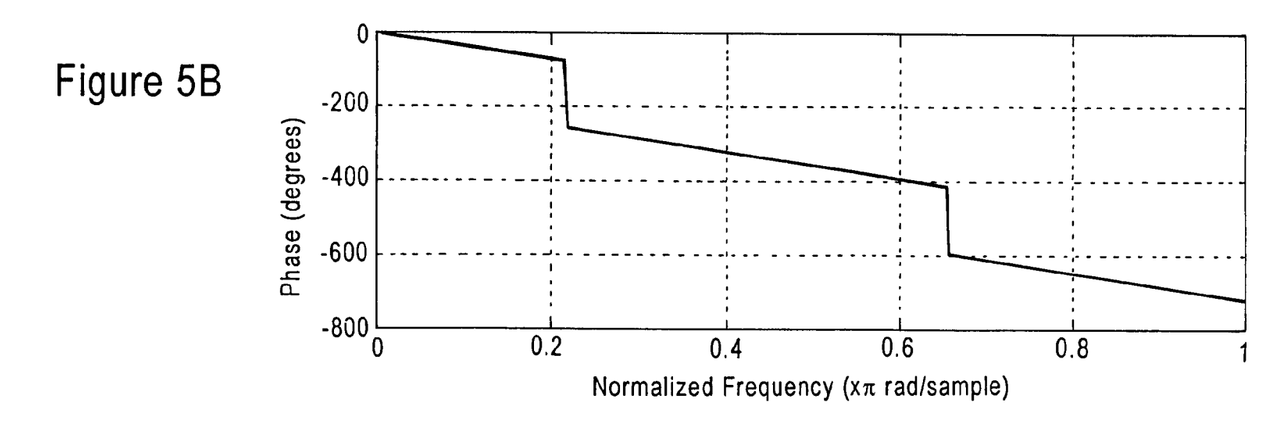

The I/Q compensation module 52 includes a pilot notch filter 100, a DC notch filter 102, a time domain-based I/Q imbalance estimator 104, and an I/Q compensator 106. The pilot notch filter 100 has the frequency and phase response characteristics as illustrated in FIGS. 5A and 5B, respectively, and is configured for filtering (i.e., suppressing) any pilot energy from the I and Q components output by the analog front end 40 of FIG. 2. In particular, the IEEE 802.11a OFDM wireless signal employs prescribed pilot carriers that are known by the wireless transceiver: the pilot notch filter 100, implemented for example as a finite impulse response (FIR), 5-tap symmetric filter, removes the pilot carriers and outputs first filtered components I1 and Q1. Note that the pilot notch filter 100 also can be implemented as a low pass filter.

Hence, the first filter components I1 and Q1 have closer relative power distribution than the original I and Q components.

Figure 6A:
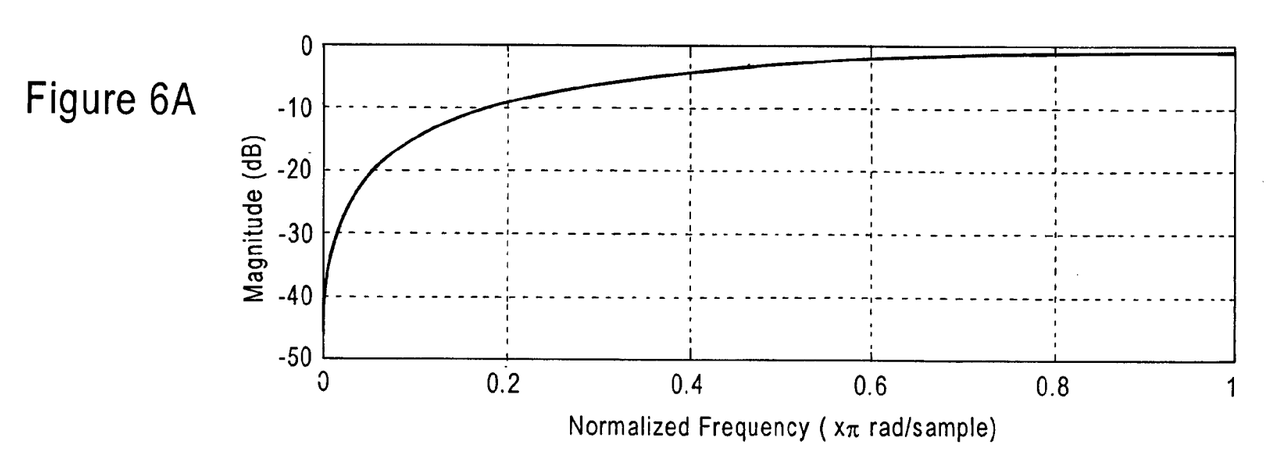
FIGS. 6A and 6B are diagrams illustrating frequency and phase responses, respectively, of the DC notch filter of FIG. 4.
Figure 6B:
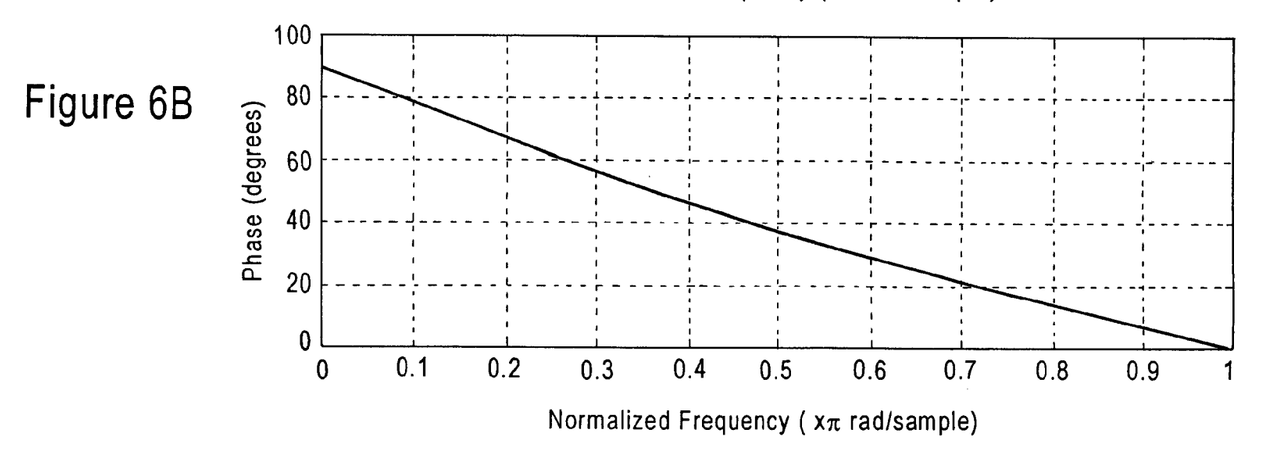

The DC notch filter 102 has the frequency and phase response characteristics as illustrated in FIGS. 6A and 6B, respectively, and is configured for filtering (i.e., suppressing) any DC energy from the I and Q components, in particular from the first filtered components I1 and Q1 output by the pilot notch filter 100, and outputting second filtered components I2 and Q2.

Hence, the second filtered components I2 and Q2 have equal power distribution based on the filtering of the pilot carriers and the DC components.

The second filtered components I2 and Q2 are supplied to the time domain-based I/Q imbalance estimator 104, which is configured for determining the relative amplitude ($\alpha$) (GAIN) and phase ($\phi$) (PHASE) imbalance between the filtered components I2 and Q2. As described with respect to FIG. 4, the I/Q imbalance estimator 104 implements in hardware the above-described computations for amplitude imbalance ($\alpha$) and phase imbalance ($\phi$):

$$\alpha = \frac{\sum |I(k)|}{\sum |Q(k)|} \quad \phi = \frac{\sum I(k)Q(K)}{\sum I^2(k)}$$

Figure 7A:
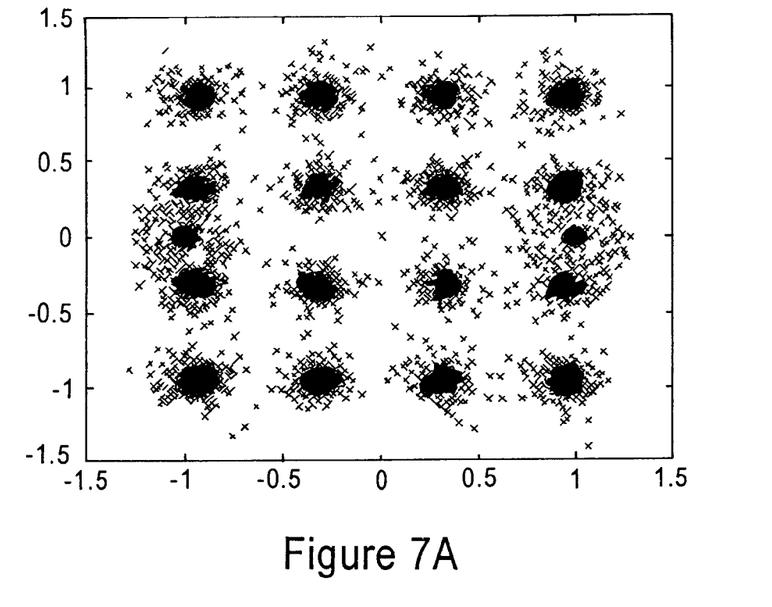
FIGS. 7A and 7B are signal constellation diagrams illustrating I/Q signals before and after I/Q compensation, respectively, by the I/Q compensation module of FIGS. 2, 3, and 4.
Figure 7B:
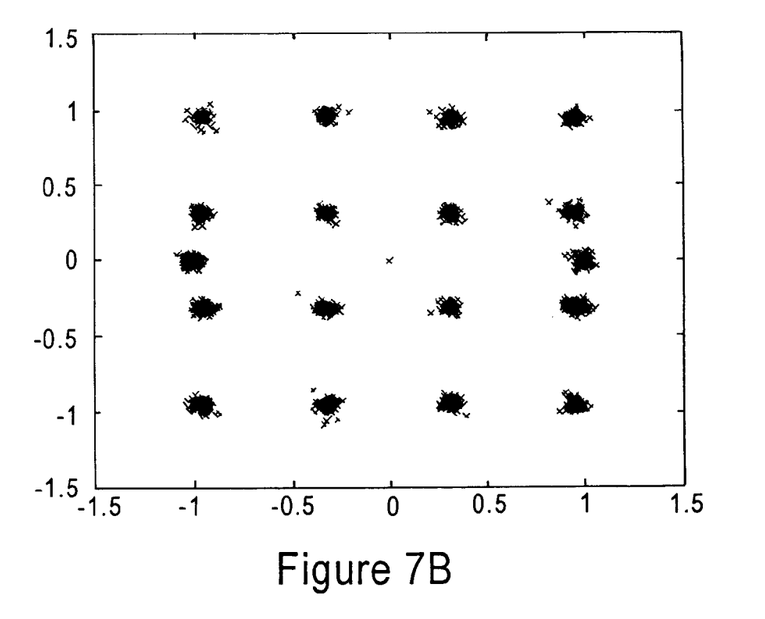

The I/Q compensator 106 is configured for compensating for the amplitude and phase imbalances in the recovered I and Q components based on the determined amplitude (GAIN) and phase (PHASE) imbalances, and outputting compensated components I' and Q'. The I/Q compensator 106 uses known compensation techniques, enabling the I and Q components output from the AFE 40, illustrated in FIG. 7A, to be compensated to the components I' and Q' illustrated in FIG. 7B.

FIG. 4 is a diagram illustrating in further detail the implementation of the estimator 104. The estimator 104 includes absolute value modules 120a and 120b for calculating absolute values for the components Q2 and I2, respectively. The estimator 104 also includes multipliers 122a and 122b for generating the products I2*Q2 and I2*I2=I2². The absolute values and products are supplied to accumulators 124a, 124b, 124c, and 124d, for accumulation over a selected number of samples counted by a counter 126.

The counter 126 is configured for controlling the accumulators 124 to accumulate over a prescribed sample range, for example on the order of 65,536 samples, in order to provide a long term statistic for the I/Q imbalance calculation.

The accumulated values for the absolute value of Q2 (|Q2|), the product of the components I2Q2, the absolute value of I2 (|I2|), and the square of the I2 component (I2*I2) are output by the respective accumulators 124a, 124b, 124c, and 124d to a divider 126 controlled by a divider state machine 128. The divider 126 divides the accumulated value of |I2| by |Q2| output by the accumulators 124c and 124a, respectively, to obtain the amplitude imbalance (GAIN), for example using a shift register. The divider 126 also divides the accumulated value of I2Q2 by I2*I2 output by the accumulators 124b and 124d, respectively, to obtain the phase imbalance (PHASE), for example using a shift register. The divider state machine 128 controls resetting of the divider.

According to the disclosed embodiment, pilot and DC components are filtered prior to performing I/Q imbalance estimation, ensuring that I and Q components used for determining the imbalance estimation have equal power distribution, ensuring accurate estimation and consequently accurate compensation.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an OFDM direct conversion receiver configured for receiving a wireless signal, the method including:
    recovering first and second components from the wireless signal by mixing the wireless signal with first and second carrier frequency signals, respectively, the second carrier frequency signal phase-shifted by a prescribed amount relative to the first carrier frequency signal;
    filtering a pilot carrier from each of the first and second components to obtain filtered first and second components, respectively, the filtered first and second components having equal power distribution;
    estimating amplitude and phase imbalances between the filtered first and second components according to a time domain based estimation algorithm; and
    compensating for the amplitude and phase imbalances in the recovered first and second components,
    wherein the filtering further includes suppressing any pilot energy from the first and second components, and
    wherein the filtering further includes filtering any DC energy from the first and second components.

2. The method of claim 1, wherein the filtering includes suppressing the pilot energy and the DC energy using a pilot notch filter and a DC notch filter, respectively.

3. The method of claim 1, wherein the first and second components recovered from the wireless signal are I and Q components, respectively.

4. The method of claim 1, wherein the step of recovering includes filtering products obtained from the mixing of the wireless signal with a low pass filter that outputs the first and second components.

5. The method of claim 4, wherein the first and second components recovered from the wireless signal are I and Q components, respectively.

6. An OFDM direct conversion receiver configured for receiving a wireless signal, the receiver including:
    an analog front end configured for recovering first and second components from the wireless signal by mixing the wireless signal with first and second carrier frequency signals, respectively, the second carrier frequency signal phase-shifted by a prescribed amount relative to the first carrier frequency signal;
    a filter module configured for filtering a pilot carrier from each of the first and second components to obtain filtered first and second components, respectively, so that the filtered first and second components have equal power distribution;
    an estimator module configured for estimating amplitude and phase imbalances between the filtered first and second components according to a time domain based estimation algorithm; and
    a compensator configured for compensating for the amplitude and phase imbalances in the recovered first and second components,
    wherein the filter module includes a first filter configured for suppressing any pilot energy from the first and second components, and
    wherein the filter module includes a second filter configured for filtering any DC energy from the first and second components.

7. The receiver of claim 6, wherein the first filter is a pilot notch filter and the second filter is a DC notch filter, respectively.

8. The receiver of claim 6, wherein the first and second components recovered from the wireless signal are I and Q components, respectively.

9. The receiver of claim 5, wherein the analog front end is configured for filtering products obtained from the mixing of the wireless signal with a low pass filter that outputs the first and second components.

10. The receiver of claim 9, wherein the first and second components recovered from the wireless signal are I and Q components, respectively.

* * * * *